United States Patent [19]

Lynch et al.

[11] Patent Number: 5,369,732
[45] Date of Patent: Nov. 29, 1994

[54] METHOD AND APPARATUS FOR GOAL PROCESSING MEMORY MANAGEMENT

[75] Inventors: John Lynch; David Franke, both of Austin, Tex.

[73] Assignee: Trilogy Development Group, Austin, Tex.

[21] Appl. No.: 38,968

[22] Filed: Mar. 29, 1993

[51] Int. Cl.⁵ .............................................. G06F 15/00
[52] U.S. Cl. ..................... 395/51; 395/375; 395/400
[58] Field of Search ................. 395/51, 400, 375, 650

[56] References Cited

U.S. PATENT DOCUMENTS

| | | | |
|---|---|---|---|
| 4,376,297 | 3/1983 | Anderson et al. | 395/400 |
| 4,748,617 | 5/1988 | Drewlo | 359/121 |
| 4,931,931 | 6/1990 | Syre et al. | 395/650 |
| 4,999,833 | 3/1991 | Lee | 395/51 |

OTHER PUBLICATIONS

GM Plan: A Gate Matrix Layout Algorithm Based on artificial Intelligence Planning Techniques Yu Hen Hu IEEE Aug. 1990 pp. 836–845.
Breaking the Bottleneck of Sequential Decoding for high-speed digital communication C. Y. Lee 14–17 May 91 pp. 1213–1216.

*Primary Examiner*—Allen R. MacDonald
*Assistant Examiner*—Richemond Dorvil
*Attorney, Agent, or Firm*—Hecker & Harriman

[57] ABSTRACT

The present invention is a method and apparatus for managing memory in goal processing. The present invention creates search states that contain an alternative subgoal (i.e., subgoal with alternatives) and non-alternative subgoals. Problem state modifications associated with the goals contained in a search state are associated with a search state object. A search state object contains information about the search process and the goals included in the search state, and a pointer to previous search state objects. Processed goals are kept on a goal stack, and the search state object points to the first and last goal stack entry included in the search state object. A search state object includes a list of alternatives available in the search state. When a goal processing failure occurs, an alternative solution search begins with the latest search state object until an alternative is found, or a determination is made that no alternatives exist and the goal cannot be satisfied. When a goal processing failure occurs, an alternative subgoal is directly accessible without visiting each subgoal individually. Goals included in the failed processing may be collectively popped from the goal stack. Problem state modifications associated with the failed processing may be collectively undone from the problem state. Goal processing reverts to a state prior to the failed state without examining each goal within the failed state, individually removing the failed state's modifications, and individually releasing the memory used by the failed state.

15 Claims, 13 Drawing Sheets

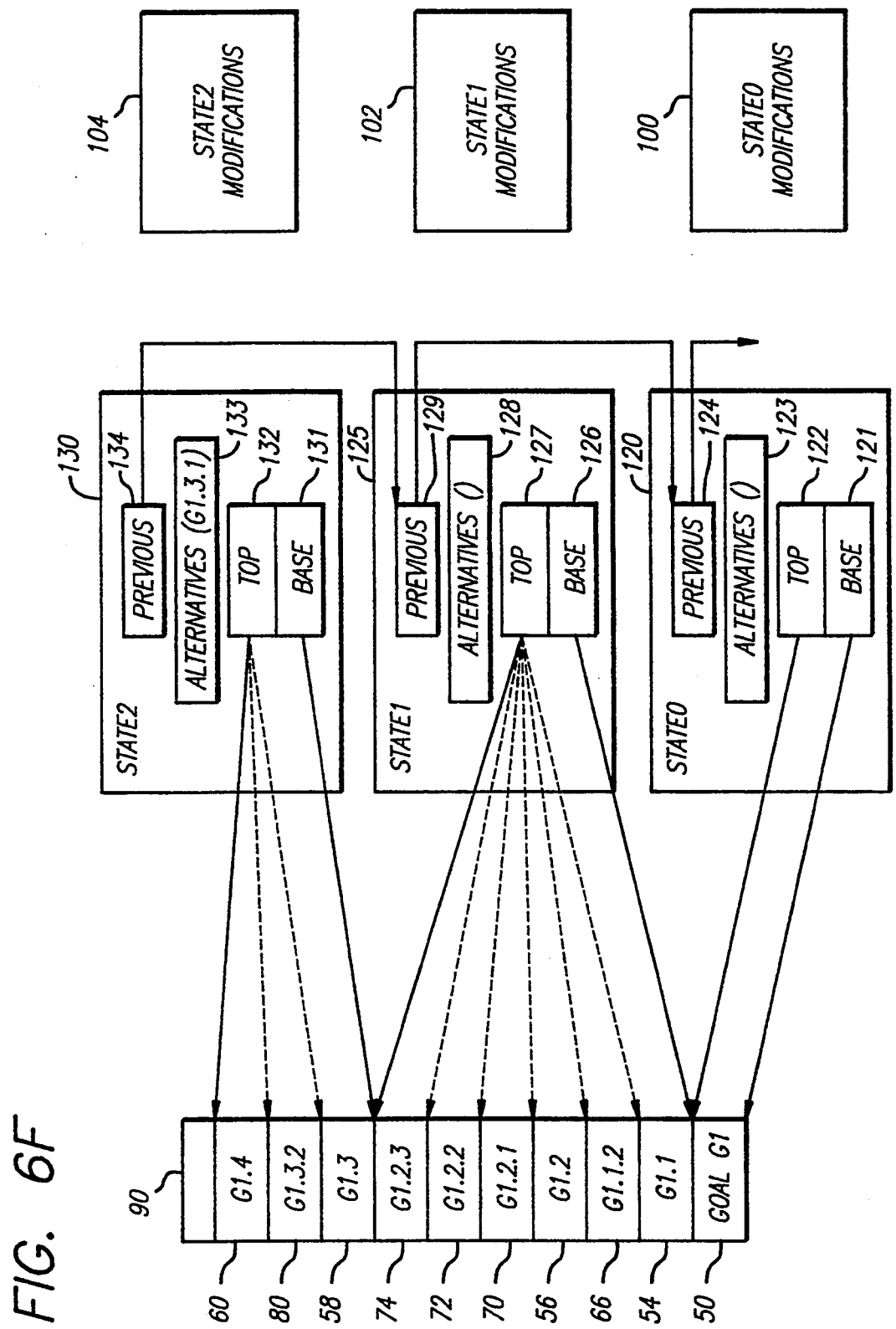

METHOD AND APPARATUS FOR GOAL PROCESSING MEMORY MANAGEMENT

BACKGROUND OF THE INVENTION

1. Field of the Invention

This invention relates to the field of memory management in goal processing.

2. Background Art

Where the completion of a project is the goal that is to be achieved, a plan can be used to identify the steps that must be completed to achieve the ultimate goal (i.e., project completion). For example, in a building construction project, the goal to be achieved is the completion of the building to be constructed. A plan that includes only this step does not provide enough detail, and would likely result in a failed attempt to construct the building. Typically, a project plan for the building's construction would include some number of subgoals that would adequately define the process of constructing the building. Thus, any goal or its subgoals could have multiple layers of subgoals that further refine the plan.

To provide the flexibility necessary to accommodate unforeseen occurrences, the plan could include alternatives. Thus, if circumstances cause a step (i.e., a subgoal) chosen to achieve a step or goal to become inadequate, the goal could be achieved by using one of any number of different alternatives. If circumstances suggest the need for an alternative, an alternative is chosen based on the construction goals that have been completed (i.e., the state of the construction without the inadequate or failed subgoal), and the construction goals that remain. In some cases, it might be necessary to disregard any construction modifications associated with the failed subgoal. If the failed subgoal's construction modifications are easily identifiable, the resources needed to eliminate the modifications are reduced.

The construction project planning example illustrates the concepts associated with a goal processing system implemented in a computer system. A goal processing system has a desired problem state (i.e., finished building) that represents the goal to be achieved. The process used to achieve the desired problem state may be broken down into subgoals that can be further broken down into additional or alternative subgoals. Alternative goals identify the alternatives that may be used to achieve the initial, root goal.

The satisfaction of goals and subgoals transform a problem state from one state to the next until the desired problem state is achieved. As goals or subgoals fail during the problem-solving process, the current problem state must be returned to a state prior to the failure. Alternative subgoals may be selected and the process continues until the desired problem state is achieved.

The search for a solution using goal processing requires a large amount of the computer's resources (e.g., memory and processing time). Memory is consumed to keep track of the goals, subgoals, alternative subgoals and problem states previously processed. If a failure occurs, the problem state should be returned to the state that existed before the occurrence of the failure. Reversion to an earlier state causes the information used by the failed state to become useless. The memory used to store this information should be reclaimed for future use. The memory reclamation can consume a considerable amount of processing time unless the unused memory can be easily identified. If the memory that is no longer needed is known, all of the freed memory can be immediately reclaimed by free memory.

Systems that currently implement goal processing or problem search solutions use a goal stack to track each goal processed. As a goal is processed, the goal is pushed onto the goal stack. When a failure occurs, the system looks for an alternative for the failed goal. If there is no alternative for the failed goal, the system backtracks through each entry on the goal stack in search of an alternative. As the system backtracks, it must "pop" the goals from the goal stack, undo each goal's modifications to the problem state, and free unused memory. When an alternative goal is found for one of the goals on the goal stack, the alternative replaces this goal (i.e., the alternative is processed and placed on the goal stack).

Since configuration modifications might occur on any goal and any goal might have unexplored alternatives, each goal must be examined and its memory reclaimed individually. Additional resources are expended during this process to examine each goal on the stack and reclaim the goal stack memory that was used to store the goals examined and popped from the goal stack.

Other goal processing systems rely on garbage collection to reclaim unwanted or unused areas of memory. The garbage collection process has the same result as when memory management of each individual goal is employed. If the garbage collection is not performed after each goal is popped from the stack, processing time is expended to confirm that a portion of memory is not addressed by another memory location.

Further, if the process of collecting unused memory is left to the garbage collection function of the computer system's operating system, there is a risk that some of the unused memory will not be reclaimed. Garbage collection routines must search for any references to memory that is being considered for collection. If a reference is inadvertently retained or a referencing cell actually contains erroneous data, the garbage collection routine will assume that the referenced cell cannot be collected, and the referenced cell will not be reclaimed.

An example of a computer-based system that uses goal processing is a computer-based system for configuring systems (i.e., automobile, telephone, and desktop computer systems). Configuration systems use a model containing the components that may be used to configure a system. When a component (e.g., floppy disk drive) is requested, a goal is created to satisfy this request.

The component request goal may be comprised of subgoals that must be satisfied to satisfy the initial, or root, component request goal. For instance, a request to include a floppy disk drive in a configured system carries with it a need to determine whether a floppy disk drive controller is available to control the operations of the floppy drive. A connection must be available to connect the controller and the floppy drive. The controller and connection requirements are processed as subgoals of the floppy disk drive initial goal.

The controller and connection subgoals may be satisfied by alternative subgoals. For example, there may be several different controllers in the model that could be selected to satisfy the controller subgoal.

When the request for a floppy disk drive is encountered during goal processing, a goal entry is added to a push-down goal stack. Goal processing continues by identifying the subgoals that must be satisfied to satisfy the initial goal. Goal stack entries are created for the floppy disk drive subgoal and the connection between the drive and the controller.

As each goal is being processed or satisfied, modifications are made to the configuration. For example, as the floppy disk drive controller subgoal is being processed, an occurrence of the floppy controller is added to the configuration. At that point, the configuration includes the floppy disk drive component and occurrence and the floppy disk drive controller.

When the connection subgoal processing fails (e.g., a connection cannot be made between the floppy disk drive and controller selections), prior art goal processing systems examine each goal stack entry to find an alternative. As each goal stack entry is being examined, the goal stack entry must be popped off the stack, associated configuration modifications must be removed from the configuration, and the unused memory must be allocated to free memory. This process is repeated until an alternative is found for one of the goal stack entries, or it is determined that no alternatives exists and the initial goal cannot be satisfied.

The examination process can expend an excessive amount of processing resources as the number of non-alternative subgoals increases, since each goal stack entry is examined in search of an alternative regardless of whether they are alternative subgoals. In addition, the process of freeing memory and undoing modifications is repeated multiple times thereby creating an inefficient use of processing resources.

To reduce the resources expended when a goal failure occurs, alternative goals should be immediately and directly accessible. Goals located above the alternative goal on the goal stack should be popped off the stack simultaneously, and the associated memory immediately reclaimable as free memory for future use. Problem state modifications associated with the goals removed should be immediately identifiable such that all of the modifications can be undone in one operation, and the problem state returned to the point at which an alternative is identified.

SUMMARY OF THE INVENTION

The present invention is a method and apparatus for managing memory in goal processing. The present invention creates search states that contain an alternative subgoal (i.e., subgoal with alternatives) and non-alternative subgoals. Problem state modifications associated with the goals contained in a search state are associated with a search state object. When a goal processing failure occurs, an alternative subgoal is directly accessible without the need to visit each subgoal above it on the goal stack. Goals included in the failed processing may be collectively popped from the goal stack. The problem state modifications associated with the failed processing may be collectively undone from the problem state. Therefore, the goal processing may revert to a state prior to the failed state without examining each goal within the failed state, individually removing the failed state's modifications, and individually releasing the memory used by the failed state.

Search state objects contain information about the search process and the goals included in the search state, including an alternative subgoal list, a pointer to the previous search state object, and pointers to the search state's first and last goal entries on the goal stack.

Each time an alternative subgoal (i.e., a subgoal that may be satisfied by more than one subgoal) is encountered, a new search state object is created. Search state objects may contain any number of non-alternative subgoals. When a failure occurs during goal processing, the latest search state object is examined for an alternative, the goal stack entries for the latest search state object are collectively popped from the goal stack, the problem state modifications associated with these goals stack entries are collectively removed from the problem state, and the unused memory is collectively allocated to free memory. The problem state immediately reverts to the state that existed prior to processing the failed search state.

If the latest search state object contains an alternative subgoal, the alternative is selected and the list of alternatives is modified to eliminate the alternative chosen. The alternative is pushed onto the goal stack. The search state pointer to the first and last goal stack entry in the latest search state object are updated to reflect the goal stack entries. Processing continues until the initial goal and its subgoals are satisfied, or another failure occurs.

If the latest search state object does not contain any available alternatives, the pointer to the previous search state object provides the ability to examine previous search states until an alternative goal is encountered, or a determination is made that no alternatives exist. Search state objects that contain no alternatives are released and the unused memory is allocated to free memory. If no alternatives exist in any of the search state objects, the initial goal cannot be satisfied.

BRIEF DESCRIPTION OF THE DRAWINGS

FIG. 6F illustrates the memory elements associated with search state objects assuming G1.1.2 and G1.3.2 and while subgoal G1.4 is being processed.

DETAILED DESCRIPTION OF THE INVENTION

A method and apparatus for managing memory in goal processing is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Goal Processing

A goal represents a desired problem state (i.e., solution). Goals may be composed of solution steps, or subgoals. Subgoals may present alternative methods for achieving the goal, or they may be subparts of the goal. Subgoals are linked to their parent goals. Subgoals may be composed of subgoals and/or alternative subgoals. This recursive structure can be constructed to arbitrary depth, forming a "tree" of goals and subgoals.

A computer-based system to configure systems (e.g., automobiles or telecommunications system) is an example of a goal processing system. A Configuration System generates a system configuration based on input such as a component request. Each component request translates into a goal to be satisfied. Each goal may be subdivided into subgoals that must be satisfied to satisfy the goal. A subgoal may consist of alternative subgoals that may be used as alternative solutions to satisfying the goal. For instance, a component request for a radio in an automobile may be satisfied by numerous stereo component alternatives. The use of any one alternative will depend on its compatibility with the components already chosen for the automobile's stereo system.

As each subgoal is processed, the configuration is modified to include the requested component. For example, a automobile radio request may include a wiring connection subgoal. When the connection subgoal is processed, the wiring is added to the stereo system If it is determined that the goal or its subgoals cannot be satisfied, any modifications made to the configuration during the processing of the request must be undone (i.e., removed from the configuration).

When a goal failure occurs, alternative goals must be immediately and directly accessible. Goals processed after the last alternative goal processed must be collectively removed, and modifications made to the problem state must be undone. The associated, unused memory should be immediately allocated as free memory for future use.

Figure 2:
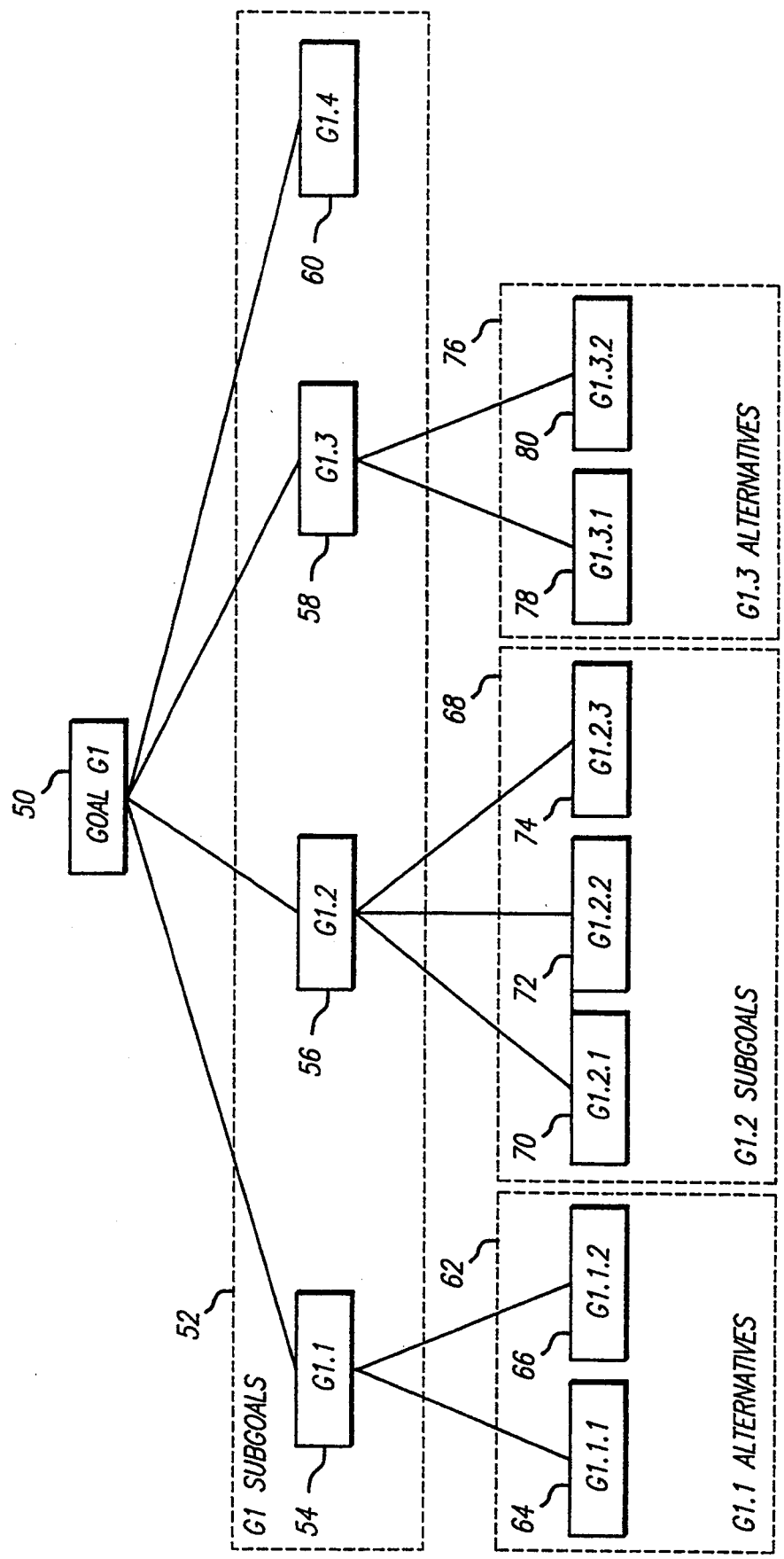
FIG. 2 illustrates the goal tree.

Multiple alternative solutions (i.e., multiple sets of subgoals) may be available to satisfy a goal. That is, a single branch of the goal tree may be traversed until a solution is found or it is determined that it cannot yield a solution. FIG. 2 illustrates a goal tree. A goal can have multiple subgoals and each subgoal can have its own subgoals. At the root of the tree, Goal G1 represents the goal to be satisfied. G1 subgoals are the subgoals that must be satisfied to satisfyGoal G1. G1.1 is a subgoal of Goal G1. G1.1 may be satisfied by either alternative subgoal G1.1.1 or G1.1.2. G1.2 has three subgoals G1.2.1, G1.2.2, and G1.2.3 that must be satisfied to satisfy G1.2. G1.3 may be satisfied by either alternative subgoal G1.3.1 or G1.3.2.

Goal Processing Memory

In the present invention, goals are represented as objects in memory. As goals are processed, a goal stack (i.e., push-down stack) is used to store the goals processed during the search. Search state objects are created to track the problem state transitions, and identify alternative solution paths. A search state object is created for the goal (i.e., component request) to be satisfied. Subsequent search state objects are created each time a subgoal with multiple alternatives is encountered.

In the preferred embodiment, the search state object includes a pointer to the first goal stack entry associated with the search state object, a pointer to the last goal stack entry associated with the search state object, and a pointer to the previous search state object. The goal stack pointers are used to collectively pop the failed search state goal entries from the stack. It is therefore unnecessary to examine and release goal stack entries individually when a failure occurs. All memory on the goal stack allocated during the failed search state processing can be reclaimed immediately. The previous search state pointer locates the previous search state object and its available alternatives.

Each search state object includes a list of alternatives. If the current search state processing fails assuming an alternative subgoal in the current search, the list of alternatives can be examined to identify another alternative. If no alternatives exist in the current search state, the previous search state object can be examined for alternatives.

The processing of goals and subgoals includes the modification of the problem state to which a solution is being sought. These modifications transform a problem from one state to another. Thus, each goal has a set of modifications to be made to the problem state. Modifications made during search state processing, must be undone if a failure occurs.

Each search state object contains a list of modifications to the problem state. The modification list is used to undo the goal's modifications to the problem state, if the goal cannot be satisfied. The modifications posted to the problem state during failed search state processing may be removed from the modifications list and the problem state. This process of backtracking returns the problem state to the state prior to the current attempt to satisfy the goal.

During the search, when a goal cannot be satisfied, all the memory on the goal stack allocated since the last search state was created can be reclaimed immediately, and the modification list recorded on this current search state indicates what configuration modifications must be undone. If the alternatives for the goal associated with the current search state have been exhausted, then that goal cannot be satisfied, and all memory allocated from the goal stack for goals created since the previous search state can be reclaimed immediately. Its modification list is undone, and search continues with the next alternative for the associated goal.

Goal Processing Implementation Flow

Figure 1A:
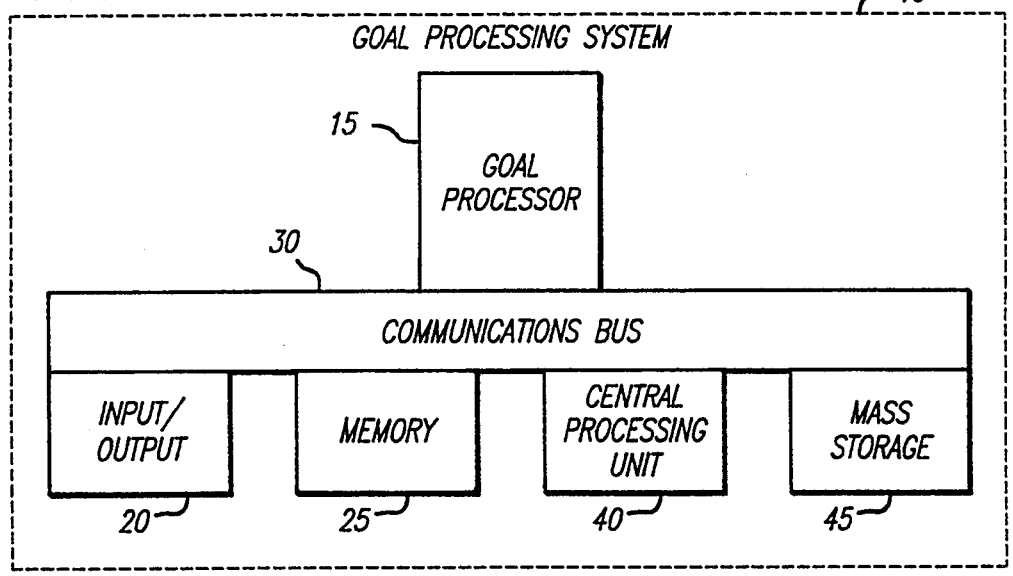
FIG. 1A is a block diagram of a goal processing computer system.

FIG. 1A illustrates a computer system for goal processing. The Goal Processing System 10 comprises a Goal Processor 15, Input/Output 20, Memory 25, Central Processing Unit (CPU) 40, and Mass Storage 45. Even though Goal Processor 15 is shown as separate from CPU 40, Goal Processor 15 may be implemented using any computer programming language and translated to machine executable code for execution in CPU 40. Examples of microprocessors that can be used for CPU 40 are the Motorola 68030 or 68040 or the Intel 386 or 486. Any other suitable microprocessor or microcomputer may be used. Memory 25 is comprised of dynamic random access memory (DRAM). Communication Bus 30 transfers data between and among the components such as CPU 40, Memory 25, and Mass Storage 45. Mass Storage 45 may include both fixed and removable media, such as magnetic, optical, or magneto-optical storage systems or any available mass storage technology.

Goal Processor 15 uses Memory 25 to store information during goal processing. Memory used by Goal Processor 15 is called allocated memory. When Goal Processor 15 is determines that it does not need some portion of memory allocated for its processing, it can release the memory.

Referring to

Figure 1B:
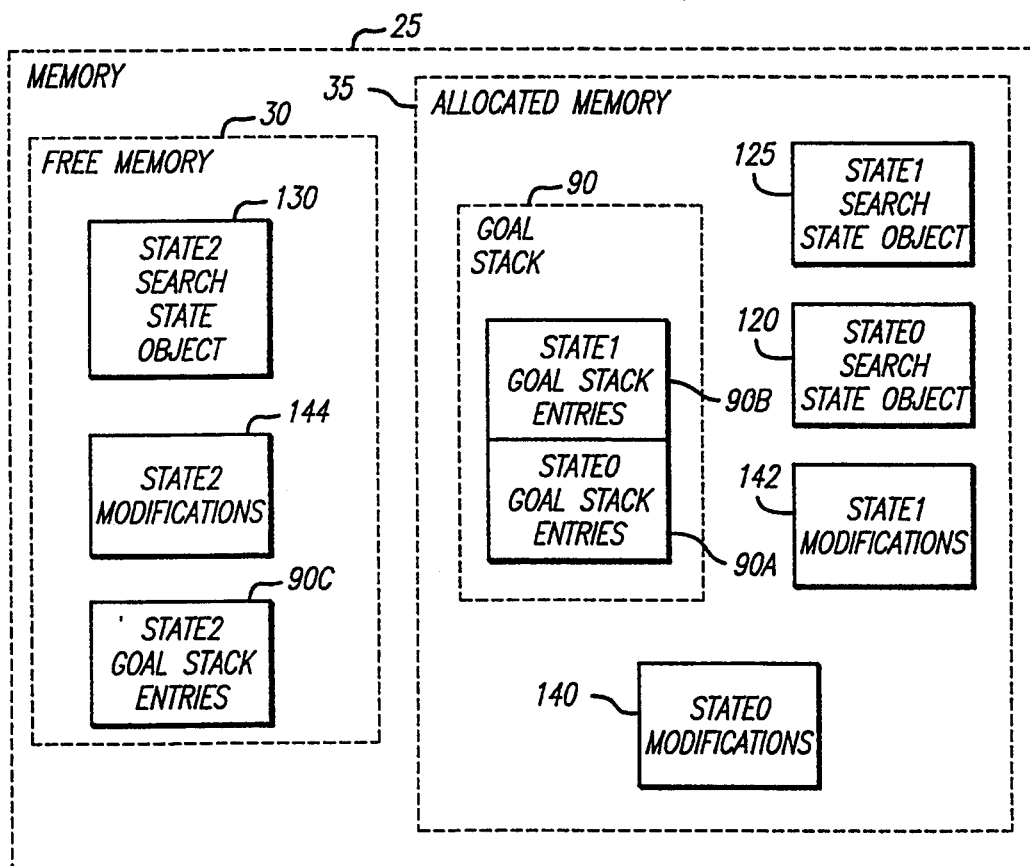
FIG. 1B illustrates the memory component of a goal processing computer system.

FIG. 1B, Goal processor 15 uses Allocated Memory 35 to store information for processing such as Goal Stack 90, State0 Search State Object 120, State1 Search State Object 125, State0 Modifications 140, and State1 Modifications 140. Free Memory 30 consists of memory that has not been used by Goal Processor 15. Free Memory further consists of memory that was released from Allocated Memory 35 by Goal Processor 15. For example, when a failure occurs, memory used to store the information associated with the failure may be immediately released and placed in free memory for future use.

FIG. 1B illustrates the state of Memory 25 when a processing failure occurs while processing the last goal stack entry associated with State2 Search State Object 130. The goal stack entries associated with State2 Search State Object 130 (i.e., State2 Goal Stack Entries 90C) are popped from Goal Stack and the associated memory is returned to Free Memory 30. The memory used to track State2 Modifications 144 (i.e., the modifications performed while processing the goals and subgoals included in the failed search state) can be reclaimed after the modifications are removed.

The failed search state is examined for an alternative subgoal. If the failed state does not contain an alternative, the failed state is no longer useful and the failed state's search state object (i.e., State2 Search State Object 130) can be reclaimed by Free Memory 30. Goal processing continues by examining the previous search state for an alternative.

In the System Configuration example described above, a goal is created each time a component request is made. When a command is received by the Goal Processor to configure a system using the component requests, a routine is invoked to process each one of these component requests, or goals. This routine is referred to as Main. For each goal, Main creates the state search object for the initial, root goal (e.g., satisfy component request) and calls a satsifyGoal process. SatisfyGoal processes the initial, root goal's subgoals and alternative subgoals and makes any configuration modifications associated with the subgoals and alternative subgoals used in satisfying the root goal. If satisfyGoal is successful, Main commits the modifications made to the configuration in satisfyGoal to the configuration. This provides a base that may be reverted to if goal processing fails while processing the next root goal. If satisfyGoal is unsuccessful, Main removes any configuration modifications performed by satisfyGoal still in existence, and frees any allocated memory associated with the failed goal processing.

Figure 3:
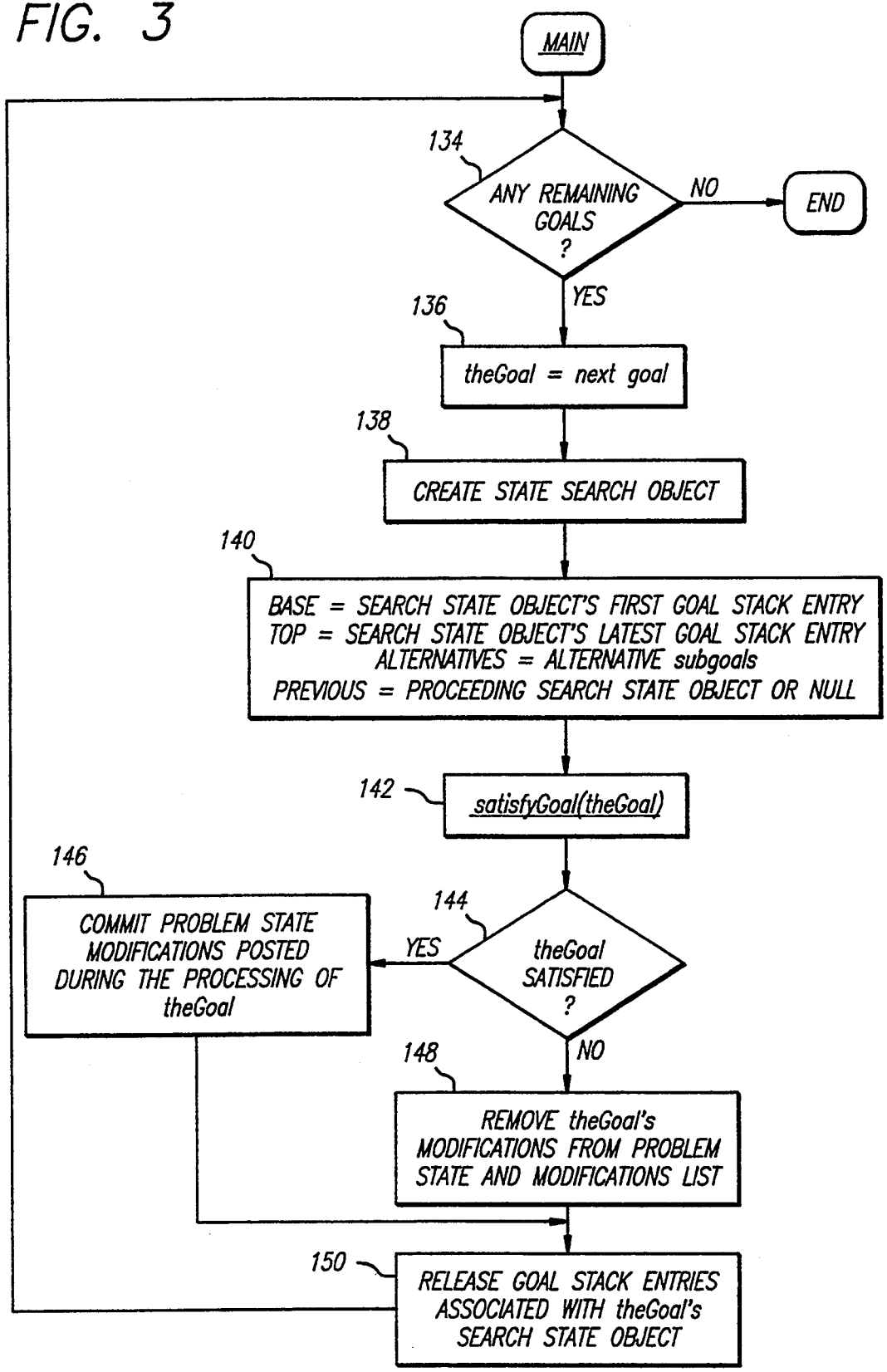
FIG. 3 illustrates the Main process flow.

FIG. 3 illustrates the process flow of Main. At decision block 134 (i.e., "any remaining goals?"), if there are no remaining goals, processing is terminated. If not, the next goal is assigned to theGoal at processing block 136. At processing block 138, a state search object is created. At processing block 140, base is set to the first goal stack entry, top is assigned the value of the latest goal stack entry, alternatives contains a list of available alternative subgoals, and previous is set to the preceding search state object or null (i.e., if first search state object).

At processing block 142, satisfyGoal(theGoal) is invoked to satisfy the goal and its alternative subgoals and subgoals. At decision block 144 (i.e., "theGoal satisfied?"), if the goal is satisfied, the problem state modifications associated with the goal and its subgoals and alternative subgoals are committed, and these modifications are removed from the modifications list at processing block 146. Processing continues at processing block 150.

If the goal is not satisfied, the modifications associated with the goal and its subgoals and alternative subgoals are removed from the problem state and the modifications list at processing block 148, and processing continues at block 150. At processing block 150, any goal stack entries associated with the goal's search state object are removed from the goals stack, and reclaimed as free memory. Processing continues at decision block 134 (i.e., "any remaining goals?").

Figure 4A:
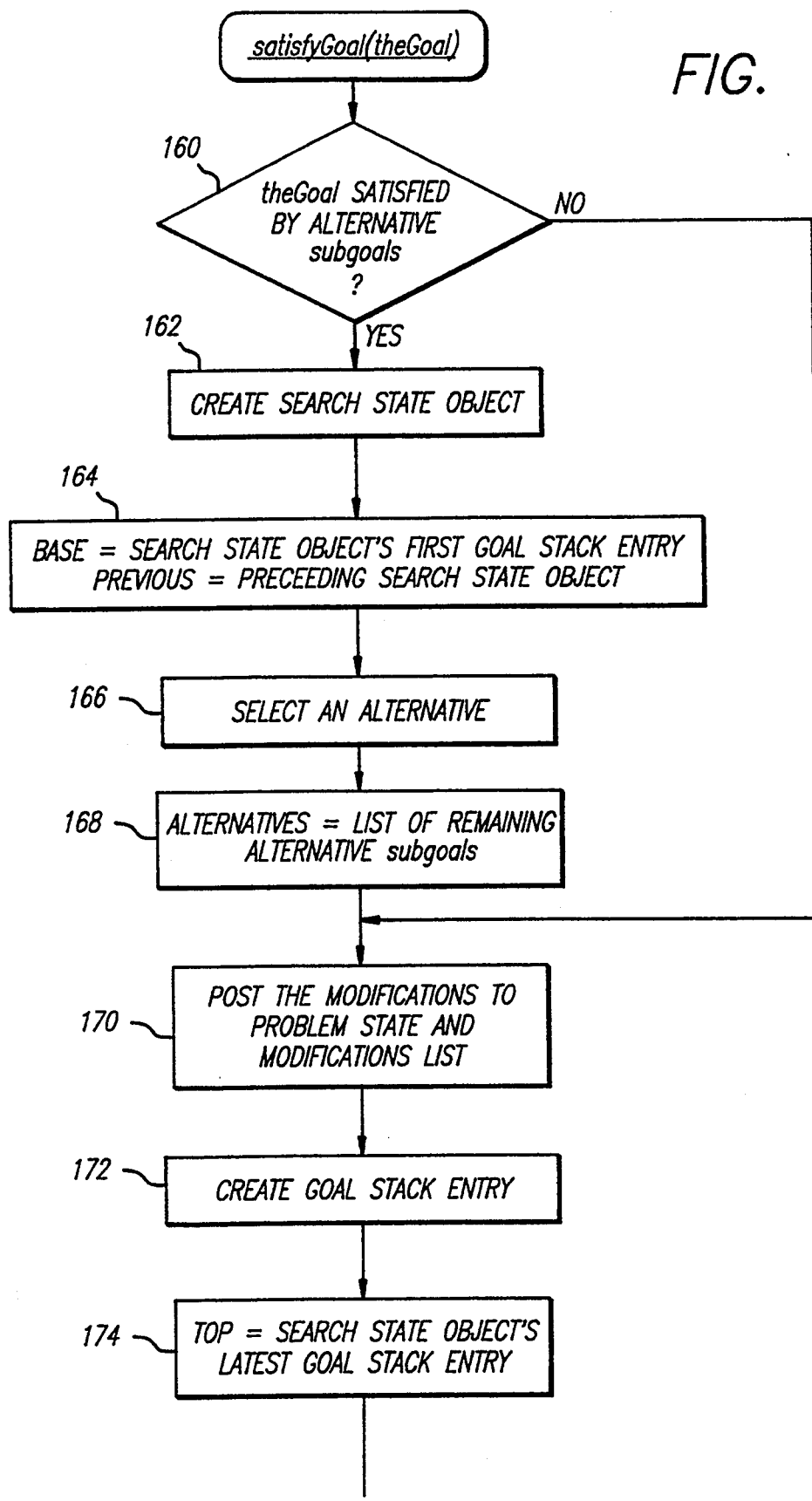
FIG. 4 illustrates the SatisfyGoal process flow.
Figure 4B:
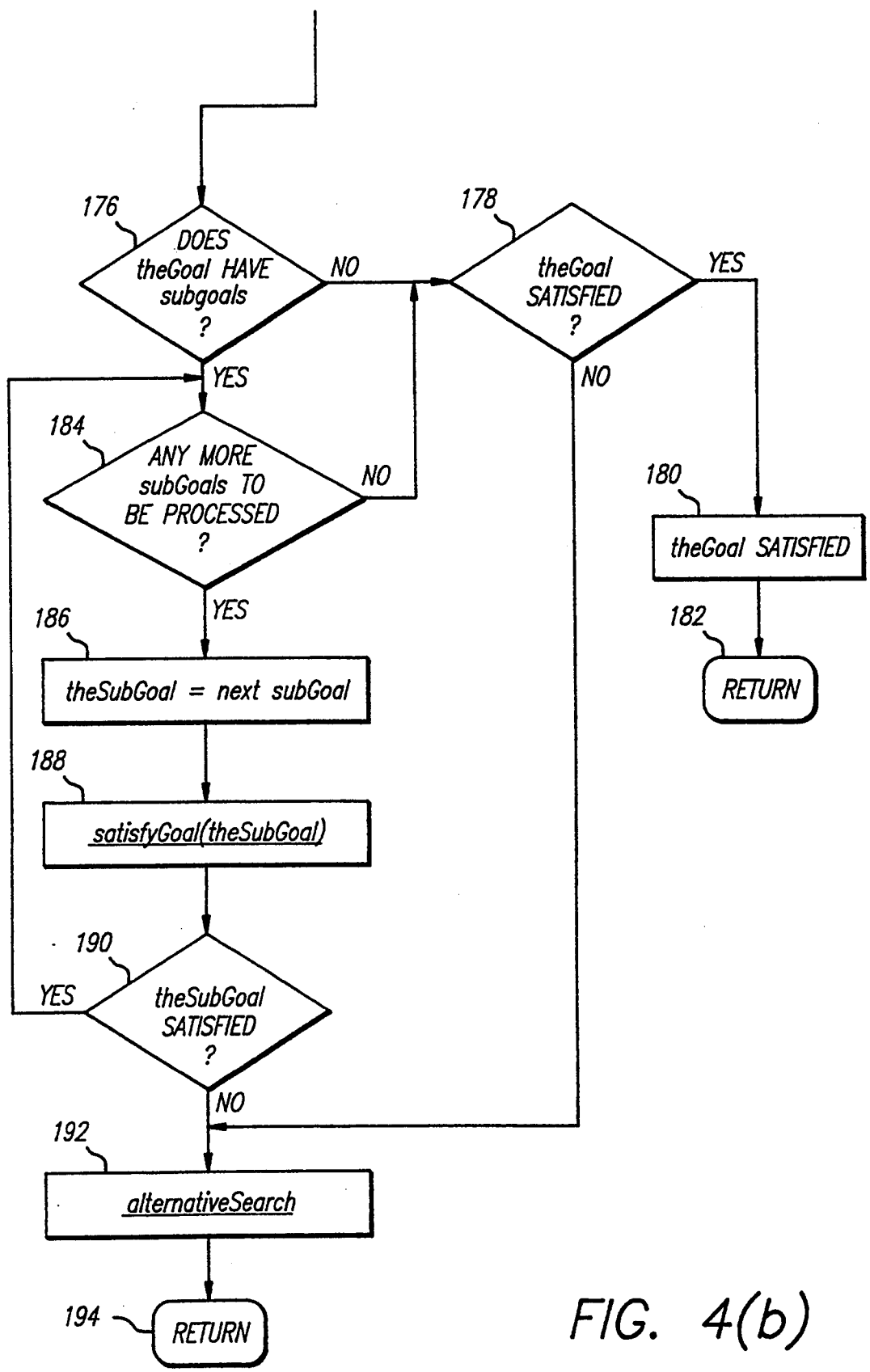

FIG. 4 illustrates the process flow for satisfyGoal(theGoal). At decision block 160 (i.e., "subgoal satisfied by alternative subgoals?"), if theGoal is not satisfied by alternative subgoals, processing continues at decision block 170. If it is, a search state object is created at processing block 162. At processing block 164, base is set to the first goal stack entry in the search state object, and previous is a pointer to the previous search state object (or null). At processing block 166, an alternative subgoal is selected from the list of alternatives, and, at 168, the list of alternatives is updated to remove the alternative selected.

At processing block 170, any problem state modifications associated with theGoal are posted to the problem state and the modifications list. At processing block, a goal stack entry is created. The top of the latest goal stack entry associated with the latest search state object is stored in top at processing block 174. At decision block 176 (i.e., "does theGoal have subgoals?"), if theGoal does not have subgoals, processing continues at decision block 178. At decision block 178 (i.e., "theGoal satisfied?"), if theGoal was satisfied, satsifyGoal indicates that theGoal was satisfied at processing block 180, and returns to the invoking program at 182 (i.e., decision block 144 of Main, or satisfyGoal at decision block 196). If theGoal was not satisfied, alternativeSearch is invoked at 192 to determine if alternative subgoals are available in any search state object. Processing returns to the calling program at 194 (i.e., to Main at decision block 144 or satisfyGoal at 190).

If theGoal does have subgoals at decision block 176 (i.e., "does theGoal have subgoals?"), a test is made to determine if there are any more subgoals to be processed at decision block 184 (i.e., "any more subgoals to be processed?"). If not, processing continues at decision block 178 (i.e., "theGoal satisfied?"). If there are more subgoals, theSubGoal is set to the subgoal at processing block 186, and satisfyGoal is invoked to satisfy theSubGoal at block 188. At decision block 190 (i.e., "theSubGoal satisfied?"), if theSubGoal was satisfied, processing continues at decision block 184 (i.e., any more subgoals to be processed?") If theSubGoal was not satisfied, alternativeSearch is invoked at 192 to determine if alternative subgoals are available in any search state object. Processing returns to the calling program at 194 (i.e., to Main at decision block 144 or satisfyGoal at 190).

When a goal processing failure is detected in satisfyGoal, a search is started, by alternativeSearch, to find an alternative solution. The search starts with the latest search state object. If an alternative exists, the search state reverts to the state that existed before the failed alternative processing, and processing continues assuming the new alternative. If an alternative does not exist in the latest search state, previous search state's are examined until an alternative is found, or all of the search state have been examined. If no alternatives can be found, the goal being processed cannot be satisfied.

Figure 5A:
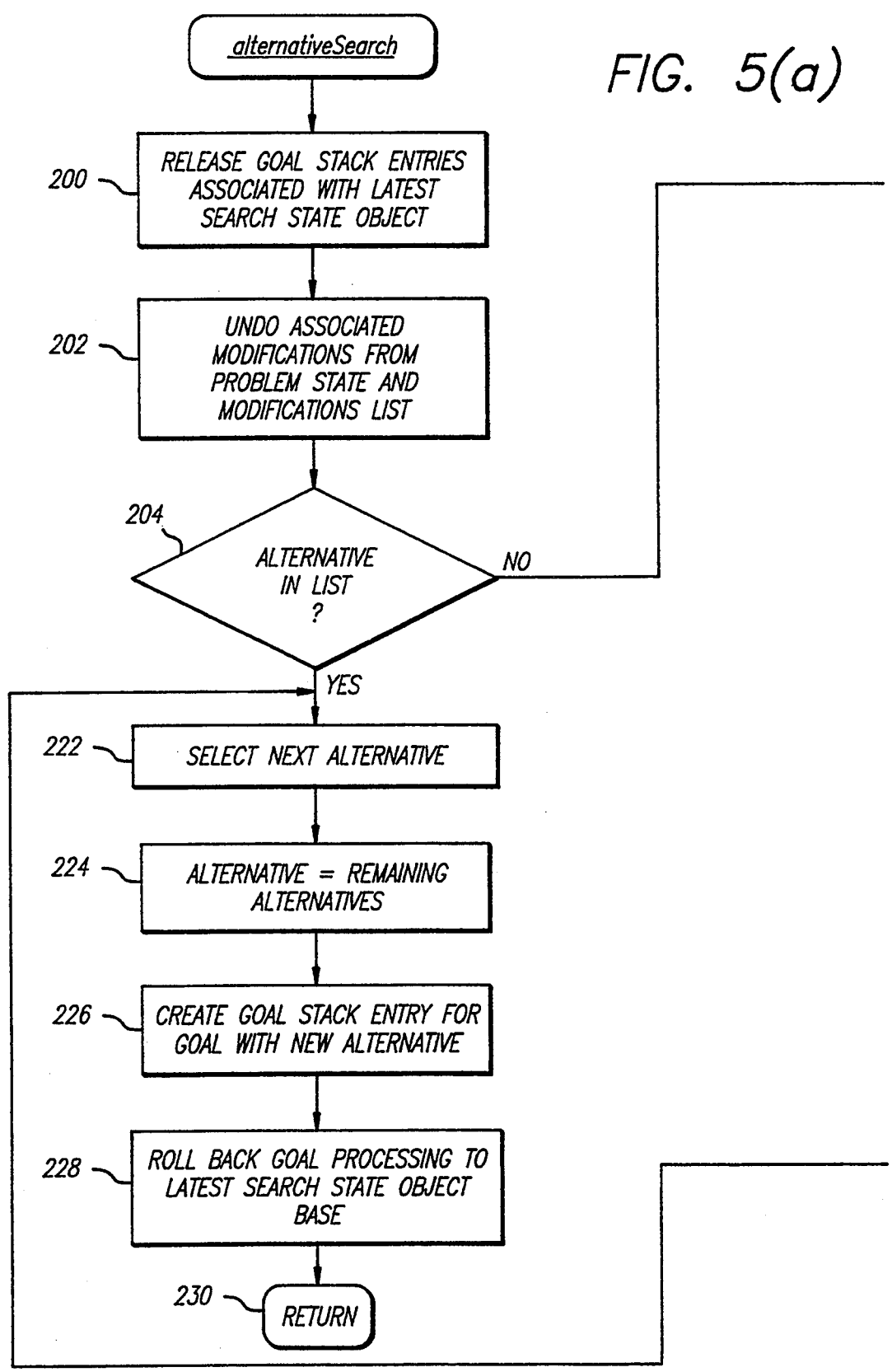
FIG. 5 illustrates the alternativeSearch process flow.
Figure 5B:
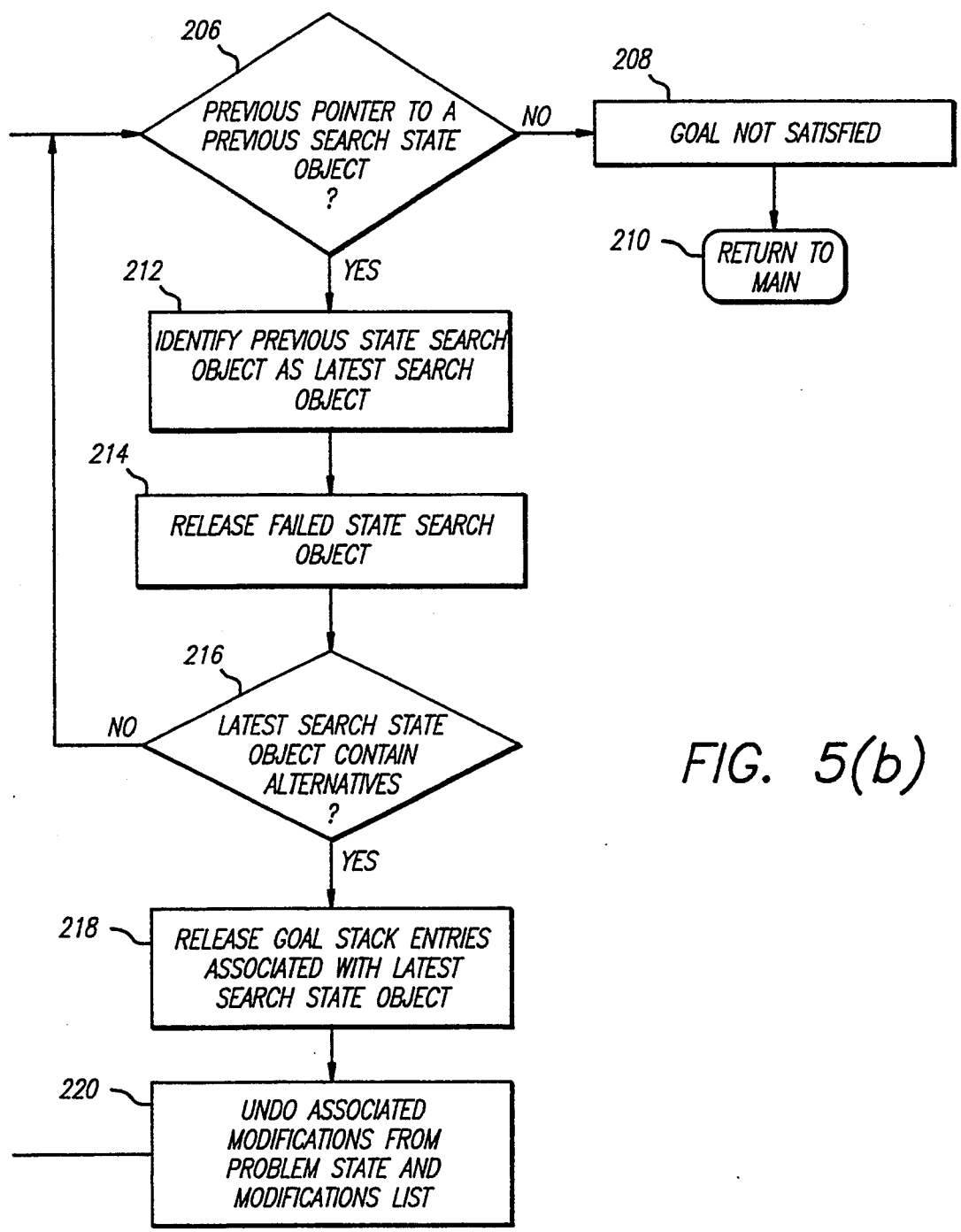

FIG. 5 illustrates the process flow of alternativeSearch. At processing block 200, the goal stack entries associated with the latest search state object are released (i.e., reclaimed as free memory). At processing block 202, the modifications associated with the latest search state object are undone from the problem state and the modifications list. At decision block 204 (i.e., "alternatives in list?"), if there are alternatives in the latest search state object, processing continues at decision block 222. If there are no alternatives in the latest search state object, processing continues at decision block 206.

At decision block 206 (i.e., "previous pointer to a previous search state object?"), if the previous pointer in the latest search state object does not point to a previous search state (i.e., null), no other alternatives exist to satisfy the initial or root goal. At block 208, the goal processing failure is noted, and processing returns to Main at 210 (i.e., Main at decision block 144). If the latest search state object's previous pointer is not null, the previous search state object becomes the latest state search object at block 212.

At block 214, the failed state search object is released from use. At decision block 216 (i.e., "latest search state object contain alternatives?"), if there are no available alternatives in the latest search state, processing continues at decision block 206 (i.e., "previous pointer to a previous search state object?"). If there are available alternatives, the goal stack entries associated with the latest search state object are released at processing block 218. At processing block 220, the modifications associated with the latest search state object are undone from the problem state and the modifications list. Processing continues at processing block 222.

At processing block 222, the next alternative is selected. The alternatives portion of the latest search state object is updated to reflect the unavailability of the alternative chosen at processing block 224. A goal stack entry is created for the new alternative at block 226. At 228, the goal processing is rolled back to the base of the latest search state object such that the new alternative is processed, and any subsequent goal are repeated or newly processed assuming the new alternative. Processing returns to the satisfyGoal at 194.

Figure 6A:
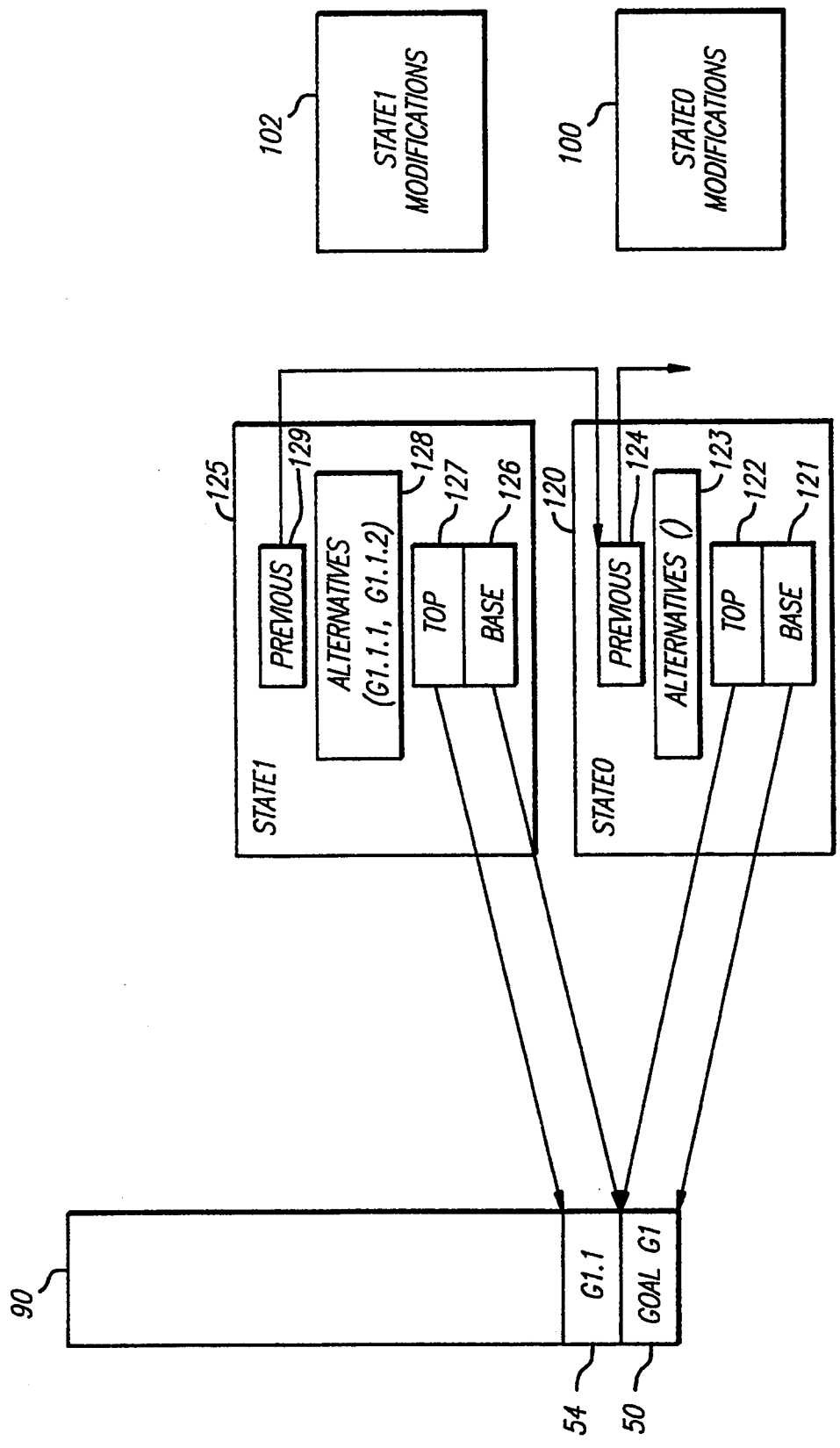
FIG. 6A illustrates the memory elements associated with search state objects after processing subgoal G1.1.

FIG. 6A illustrates the search state object and goal stack in the initial processing of the goal tree illustrated in FIG. 2. In FIG. 6A, the State0 120 is created to begin the search, and Goal G1 is allocated on Goal Stack 90. State0 120 contains Base 121 that points to Goal G1 in Goal Stack 90. Top 122 points to the last goal stack entry (i.e., Goal G1) for State0 120. Since Goal G1 has no alternative subgoals, Alternatives 123 is empty. As the initial state, Previous 124 points to null. State0 Modifications 100 contains the modifications made to the problem state by the goals included in State0 120. Goal Stack Entry G1.1 is allocated for Subgoal G1.1 (i.e., G1.1 in FIG. 2). In addition, a search state object State1 125 is created for Subgoal G1.1, since Subgoal G1.1 has alternative subgoals (i.e., G1.1 Alternatives 62 in FIG. 2). Base 126 and Top 127 point to G1.1 in Goal Stack 90. Alternatives 128 identifies the subgoal alternatives (i.e., G1.1.1 and G1.1.2 of FIG. 2) that are available to satisfy goal G1.1. Previous 129 points to the previous state's search state object, State0 120. State1 Modifications 102 contains the modifications made to the problem state by the goals included in State1 125.

Figure 6B:
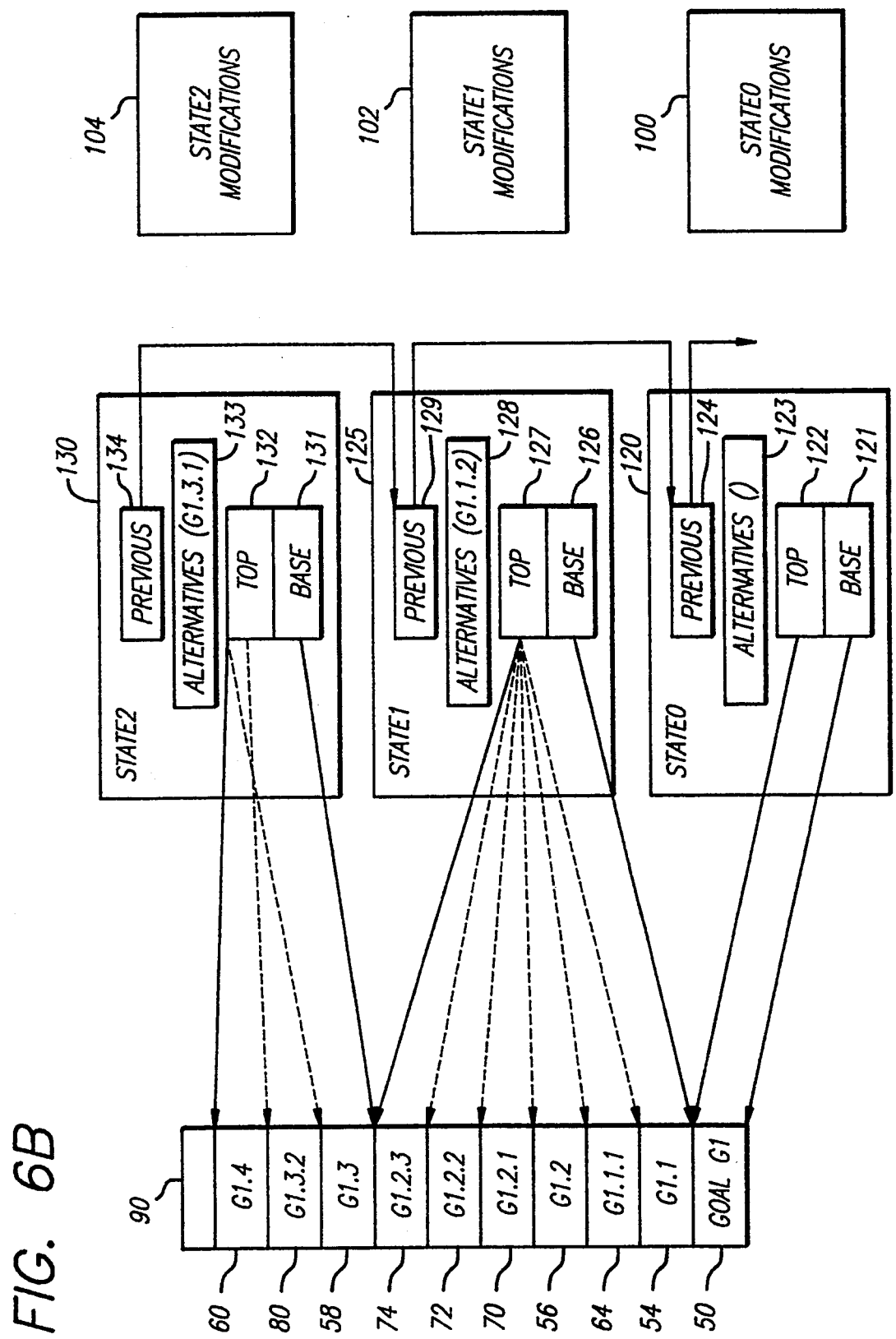
FIG. 6B illustrates the memory elements associated with search state objects during the processing of subgoal G1.4.

FIG. 6B illustrates the state search objects and goal stack after the allocations made for subgoals G1.1, G1.2, and G1.3. Alternative subgoal G.1.1.1 (block 64 in FIG. 2) was assumed for subgoal G1.1. Therefore, Alternatives 128 is modified to indicate that alternative subgoal G1.1.2 is available. A goal stack entry is allocated for alternative subgoal G1.1.1, and Top 127 is modified to point to G1.1.1. Subgoal G1.2 is allocated and Goal Stack Entry G1.2 is created. Top 127 is modified to point to G1.2.

Referring to FIG. 2, subgoal G1.2 has three subgoals (G1.2.1, G1.2.2, and G1.2.3) that must be satisfied. Because G1.2 does not introduce any alternative subgoals to the search, subgoals G1.2.1, G1.2.2 and G1.2.3 are included in the current search state (i.e., State1 125 in FIG. 6B). Referring to FIG. 6B, search State1 125 includes goal stack entries G1.2.1, G1.2.2, and G1.2.3 that were allocated for these goals. Top 127 is modified to point to the last goal stack entry (i.e., G1.2.3) included in State1 125. State1 Modifications 102 contains the modifications made to the problem state by the G1.2.1, G 1.2.2, and G 1.2.3.

Referring to FIG. 2, subgoal G1.3 is the next subgoal to be processed in satisfying goal G1. Subgoal G1.3 has two alternative subgoals G1.3.1 and G1.3.2. Referring to FIG. 6B, a new search state, State2 130, is allocated for subgoal G1.3. Alternative subgoal G1.3.2 (i.e., block 80 in FIG. 2) is assumed, a goal stack entry is allocated for G1.3.2, and subgoal alternative G1.3.1 is placed in Alternatives 133. Base 131 points to Goal Stack Entry 58 and Top 132 point to the Goal Stack Entry 80.

Referring to FIG. 2, subgoal G1.4 is the final G1 Subgoal 52 to be processed to satisfy Goal G1. Goal G1.4 ( i.e., block 60 in FIG. 2) is processed and Goal Stack Entry 60 is allocated for subgoal G1.4. Referring to FIG. 6B, a goal stack entry is created for subgoal G1.4, Base 131 points to Goal Stack Entry 58, and Top 132 is modified to point to G1.4 Goal Stack Entry. State2 Modifications 104 contains the modifications made to the problem state by the goals included in State2 130.

If subgoal G1.4 fails assuming alternative G1.3.2, the goal processing that occurred since the last alternative selection must be undone. The search objects and state modifications lists provide the ability to backtrack from the current search state to the first goal stack entry with an alternative. As illustrated in FIG. 6B, Alternatives 133 in State2 130 indicates that alternative G1.3.1 (i.e., block 78 in FIG. 2) exists, and Top 132 and Base 131 indicate that goal stack entries 58, 80 and 60 can be popped from the stack to return the search state to the state that existed before State2 130. In addition, State2 Modifications 104 (i.e., modifications associated with goal stack entries 58, 80 and 60) may be removed from the problem state. The problem state will revert to its state prior to processing State2 130.

Figure 6C:
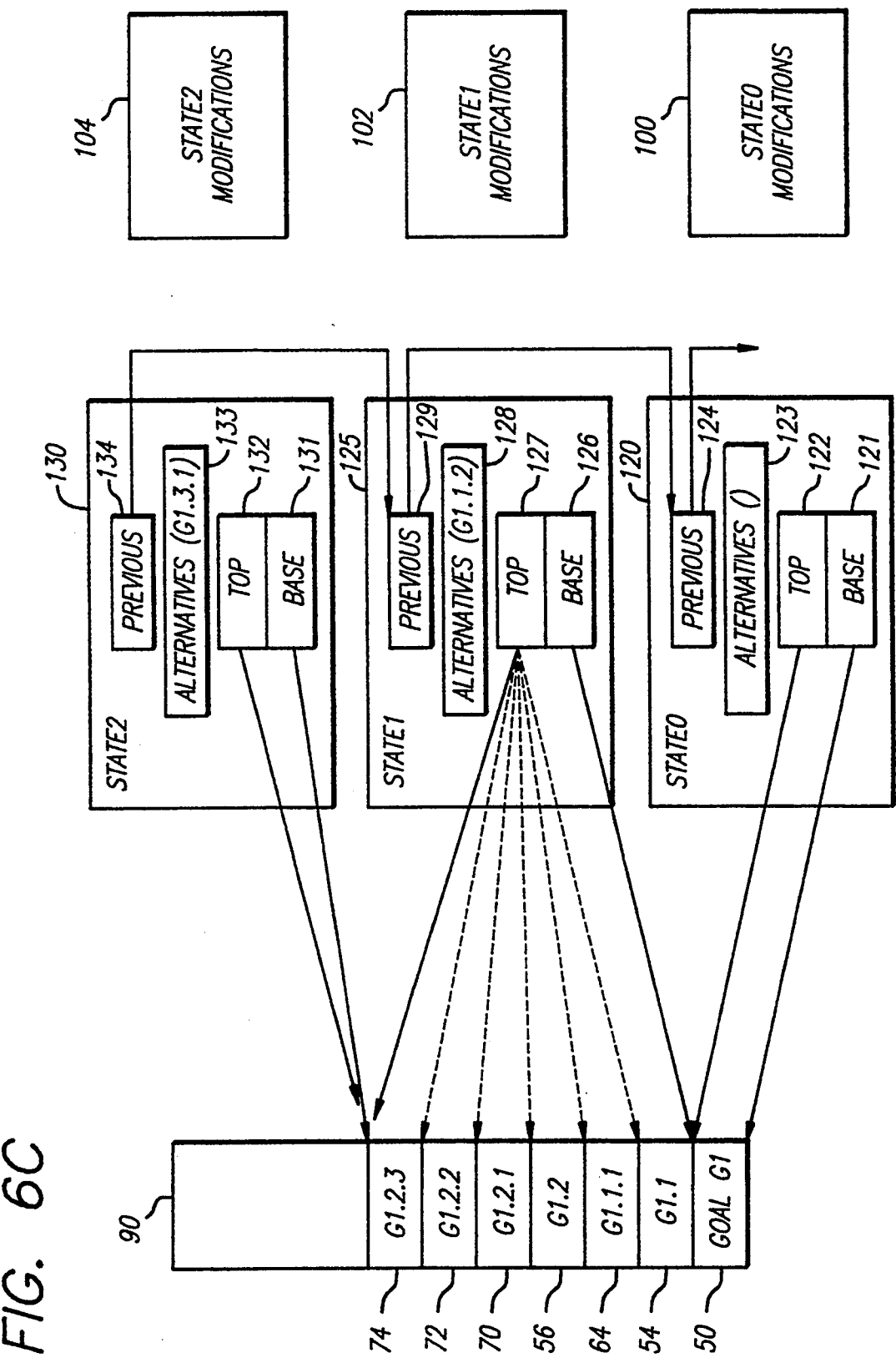
FIG. 6C illustrates the memory elements associated with search state objects after subgoal G1.1 fails assuming subgoal G1.3.2.
Figure 6D:
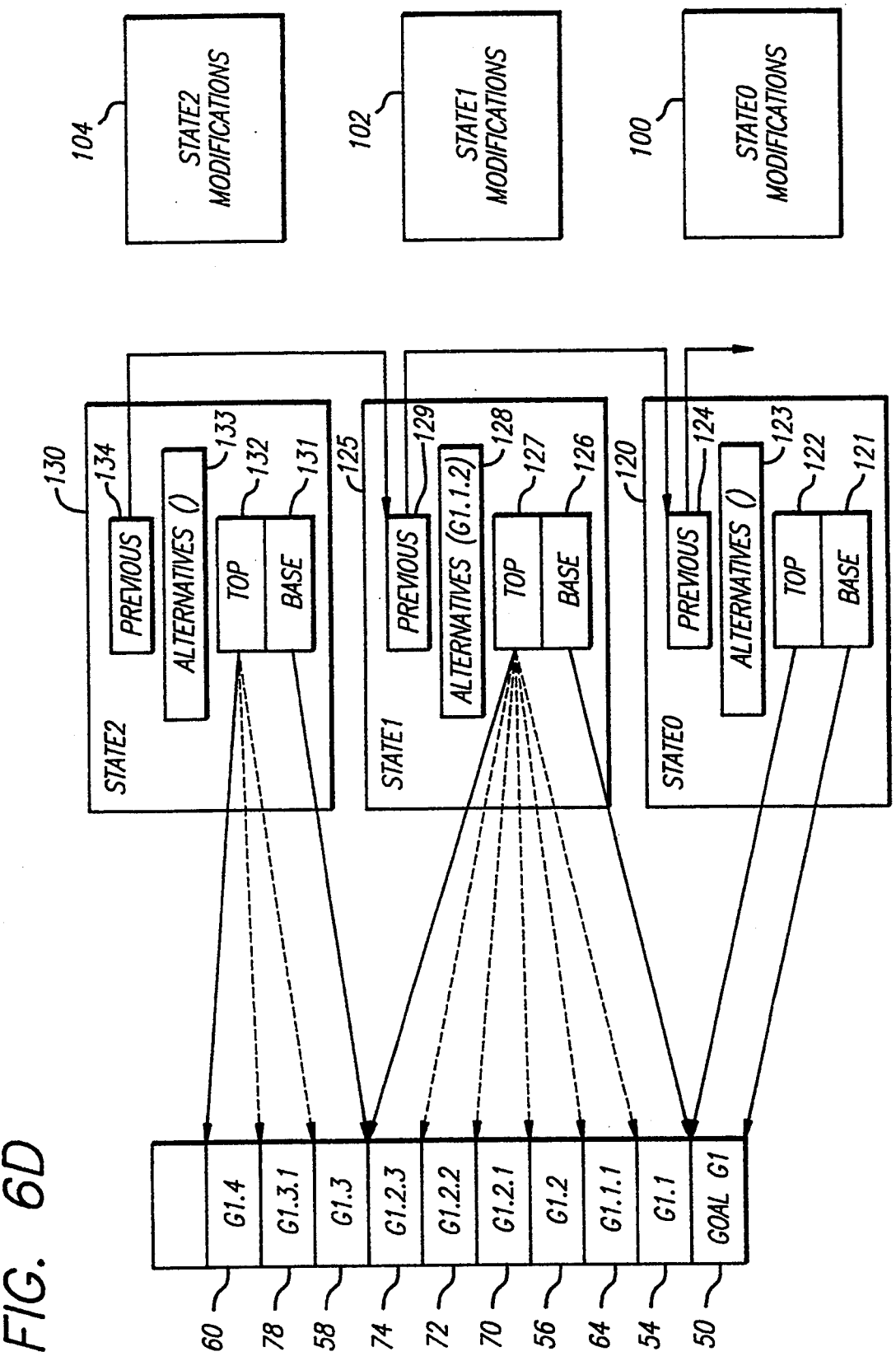
FIG. 6D illustrates the memory elements associated with search state objects assuming G1.3.1 and while subgoal G1.4 is being processed.

FIG. 6C reflects the state of goal stack 90 and search state objects after goal stack entries 58, 80 and 60 have been deallocated. Base 131 and Top 132 point to the top of the stack. Alternatives 133 in State2 130 indicates that subgoal alternative G1.3.1 (i.e., block 78 in FIG. 2) is available to satisfy subgoal G1.3 (i.e., block 58 in FIG. 2). Previous 134 continues to point to State1 125. Referring to FIG. 6D, Goal Stack Entry 58 is allocated assuming subgoal alternative G1.3.1. Base 131 and Top 132 point to Goal Stack Entry 58. Goal Stack Entry 78 is created for alternative subgoal G1.3.1. Goal Stack Entry 60 is created for subgoal G1.4 and Top 132 is modified to point to Goal Stack Entry 78 and then Goal Stack Entry 60. State2 Modifications 104 contains the modifications made to the problem state by the goals included in State2 130.

Since there are no other alternatives available in State2 130, if subgoal G1.4 fails assuming alternative G1.3.1, State2 130 must be removed. Further, goal stack entries associated with state search object State2 130 can be deallocated. Top 132 and Base 131 indicate that goal stack entries 58, 78 and 60 can be popped from the stack. State2 Modifications 104 contains the modifications associated with goal stack entries 58, 78 and 60. These modifications can be collectively removed from the problem state. The problem state will revert to a state prior to State2 130. The unused memory associated with the failed state is reclaimed by free memory.

Figure 6E:
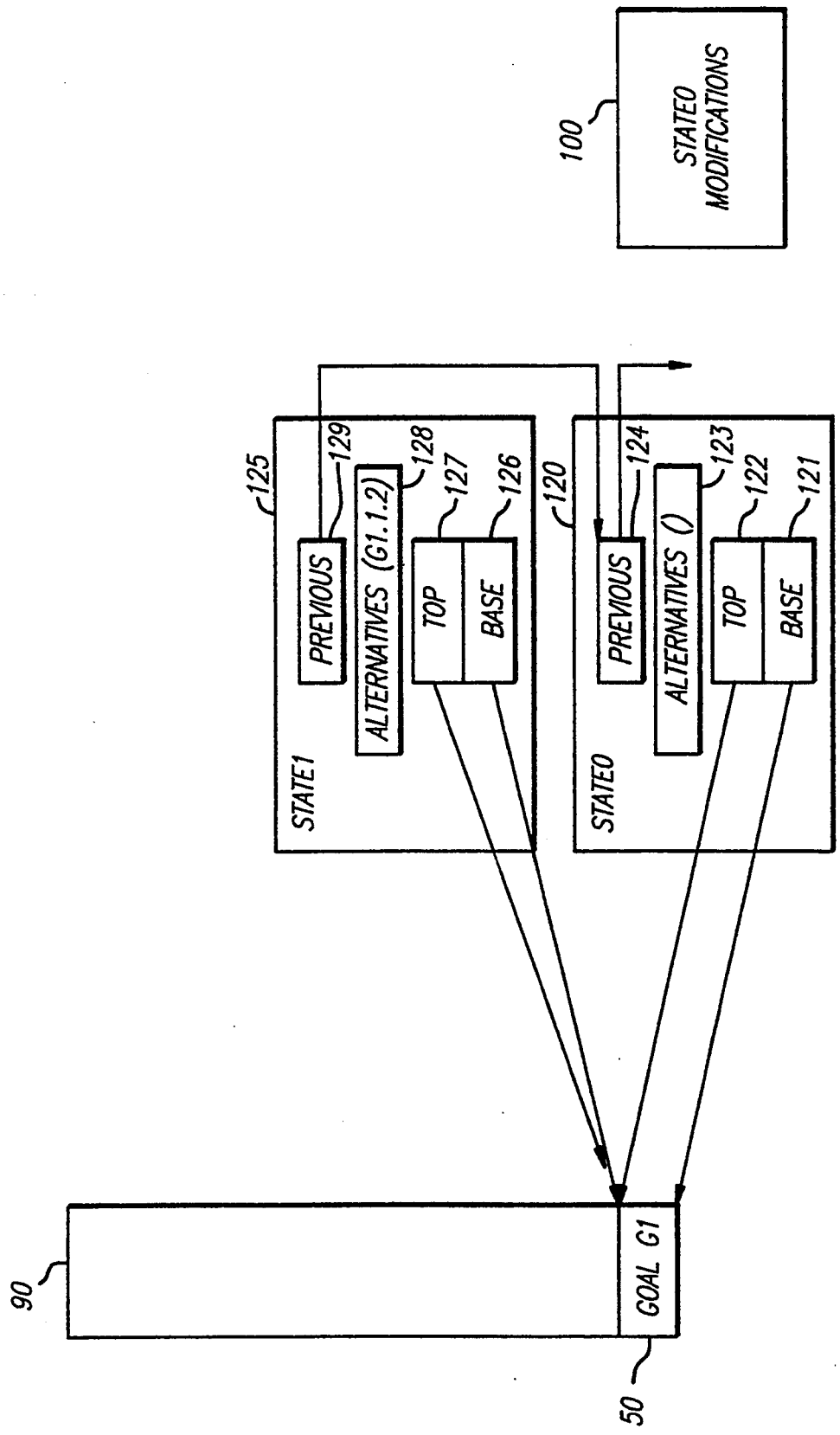
FIG. 6E illustrates the memory elements associated with search state objects after subgoal G1.4 fails assuming G1.3.1.

Before considering any alternatives in State1 125, the goal stack entries associated with search state object State1 125 must be deallocated, and Top 127 and Base 126 must be redirected to the top of the goal stack after goal stack entries 54, 64, 56, 70, 72, and 74 are released. FIG. 6E reflects the goal stack and search state objects after removing search state object State2 130 and the goal stack entries associated with State2 130 and State1 125.

State1 125 is examined for alternatives. Previous 129 provides the pointer to State0 120. Alternatives 128 indicates that subgoal alternative G1.1.2 is available to satisfy subgoal G1.1. Top 127 and Base 126 point to the top of the Goal Stack 90.

Referring to FIG. 6F, State1 125 reflects the changes made to goal stack 90 after subgoal alternative G1.1.2 (i.e., block 66 in FIG. 2) is selected, and an entry is created on Goal Stack 90 for G1.1.2. Base 126 points to the first goal stack entry associated with State1 (i.e., Goal Stack Entry 54). Goal stack entries 56, 70, 72, and 74 are added as subgoals G1.2, G1.2.1, G1.2.2, and G1.2.3 are processed. Top 126 is modified as each goal stack entry is added. After subgoal G1.2.3 is processed, Top 126 is set to point to Goal Stack Entry 74. Subgoal G1.3 is processed after subgoal G1.2.3. Because subgoal G1.3 has alternative solutions, a new search state, State2 130, is created. Alternatives 133 contains G1.3 Subgoal Alternative (i.e., block 76 in FIG. 2). Alternative Subgoal G1.3.2 is assumed, a goal stack entry is created for G1.3.2, Alternatives 133 is modified to eliminate G1.3.2 from the list, and Top 132 is modified to point to Goal Stack Entry 80. A goal stack entry is allocated for Subgoal G1.4 and Top 132 is modified to point to Goal Stack Entry 60. Base 131 continues to point to Goal Stack Entry 58. Previous 134 points to State1 125.

If subgoal G1.4 fails upon consideration, the process of satisfying Goal G1 would consider alternative G1.3.1 (i.e., block 78 in FIG. 2). If G1.4 failed assuming G1.3.1 for G1.3, State2 130 and its associated goal stack entries and modifications would be removed. Since State1 125 does not contain other alternatives, State1 and its associated goal stack entries and modifications would be removed. After a determination that no alternatives are available in Alternatives 123 of State0 120, a determination is made that Goal G1 can not be satisfied.

When a goal processing failure occurs, the present invention provides the ability to identify alternative subgoals without examining each entry on the goal stack. The present invention provides the information necessary to undo a goal processing failure and any modification made to the problem state during the processing. Unused memory may be simultaneously released to free memory. Therefore, processing resources are optimized when a goal processing failure occurs. Processing time is not used to examine each goal stack entry or to search for collectible (i.e., unused) memory. All unused memory is immediately identifiable and may be reallocated to free memory.

We claim:

1. A method of managing memory in a computer system implementing a goal processor for processing a set of goals comprising the steps of:
    inputting to said goal processor a goal comprised of a plurality of subgoals and alternative subgoals;
    performing (a)–(f) when each of said goal, subgoals, and alternative subgoals are processed by said goal processor:
        (a) creating a goal stack entry;
        (b) creating a search state object when said goal is processed;
        (c) identifying said search state object as a most-recently-created search state object;
        (d) creating a new search state object when one of said alternative subgoals is processed;
        (e) identify said new search state object as said most-recently-created search state object;
        (f) associating each of said subgoals to said most-recently-created search state object; and
    detecting a goal processing failure;
    releasing simultaneously to free memory said goal stack entries associated with said most-recently-created search state objects when said goal processing failure occurs.

2. The method of claim 1 wherein said new search state object contains a list of available alternative subgoals for said one of said plurality of subgoals and said goal;

3. The method of claim 1 wherein said search state object and said new search state object contain a pointer to a first and a last goal stack entry associated with said search state object.

4. The method of claim 1 wherein said search state object and said new search state object contain a pointer to a previous search state object.

5. A method of processing a set of goals in a computer system implementing a goal processor for processing said set of goals comprising the steps of:
    inputting to said goal processor a goal comprised of a plurality of subgoals and alternative subgoals; performing (a)–(e) when each of said goal, subgoals, and alternative subgoals are processed by said goal processor:
        (a) creating a goal stack entry in a goal stack in memory of said computer system;
        (b) creating a search state object when said goal and each of said alternative subgoals are processed; and
        (c) associating each of said subgoals to a most-recently-created search state object.

6. The method of claim 5 further including the steps of:
  associating with a search state object a list of alternatives;
  detecting a goal processing failure;
  performing steps (a)-(b) when said goal processing failure occurs:
    (a) examining by said goal processor said list of alternatives in said most-recently-created search state object; and
    (b) selecting by said goal processor an alternative from said list of alternatives.

7. The method of claim 5 wherein a problem state is stored in said memory further including the steps of:
  associating a plurality of problem state modifications associated with each of said goal, subgoals, and alternative subgoals;
  performing using said goal processor said problem state modifications;
  detecting using said goal processor a goal processing failure;
  removing from said problem state said problem state modifications associated with said goal, subgoals, and alternative subgoals in said most-recently-created search state objects when a goal processing failure occurs.

8. A method of goal processing in a computer system implementing a goal processor comprising the steps of:
  storing a problem state in memory of said computer system;
  inputting to said goal processor a goal comprised of a plurality of subgoals and alternative subgoals;
  associating a plurality of problem state modifications with said goal, said subgoals, and said alternative subgoals;
  performing steps (a)-(g) when each of said goal, subgoals, and alternative subgoals are processed by said goal processor:
    (a) creating a entry in a goal stack stored in said memory;
    (b) creating a search state object when said goal is processed;
    (c) identifying said search state object as a most-recently-created search state object;
    (d) creating a new search state object when one of said alternative subgoals is processed;
    (e) identifying said new search state object as said most recently-created search state object;
    (f) associating each of said subgoals to said most-recently-created search state object;
    (g) performing using said goal processor associated problem state modifications; and
  detecting a goal processing failure;
  removing from said problem state said problem state modifications associated with said most-recently-created search state objects when a goal processing failure occurs.

9. The method of claim 8 further including the steps of:
  removing from said problem state said problem state modifications for each previous search state object until an alternative for one of said alternative subgoals is found; and
  removing from said problem state all of said problem state modifications when no alternative is found.

10. The method of claim 8 further comprising the step of making said problem state modifications permanent in said problem state when said goal processing failure does not occur.

11. A method of goal processing in a computer system comprising the steps of:
  inputting to a goal processor a goal comprised of a plurality of subgoals and alternative subgoals;]
  performing (a)-(f) when said goal and said plurality of subgoals and alternative subgoals are processed by said goal processor:
    (a) creating a goal stack entry;
    (b) creating a search state object when said goal is processed, said search state object including a list of alternatives;
    (c) identifying said search state object as a most-recently-created search state object;
    (d) creating a new search state object when one of said alternative subgoals is processed;
    (e) identifying said new search state object as said most-recently-created search state object;
    (f) associating each of said subgoals to said most-recently-created search state object;
  detecting using said goal processor a goal processing failure;
  examining said list of alternatives in said most-recently-created search state object when a goal processing failure occurs; and
  examining said list of alternatives in a previous search state object when said goal processing failure occurs and said list of alternatives in said most-recently-created search state object is empty.

12. The method of claim 11 further comprising the step of determining that said goal cannot be processed when a goal processing failure occurs when said list of alternatives in all of said search state objects is empty.

13. A method of goal processing in a computer system implementing a goal processor comprising the steps of:
  storing a problem state in memory of said computer;
  inputting to said goal processor a goal comprised of a plurality of subgoals and alternative subgoals;
  associating a plurality of problem state modifications with said goal and said subgoals and said alternative subgoals;
  performing steps (a)-(g) when each of said goal, subgoals, and alternative subgoals are processed by said goal processor:
    (a) creating a goal stack entry in a goal stack stored in said memory;
    (b) creating a search state object when said goal is processed;
    (c) identifying said search state object as a most-recently-created search state object;
    (d) creating a new search state object when one of said alternative subgoals is processed;
    (e) identifying said new search state object as said most-recently-created search state object;
    (f) associating each of said subgoals to said most-recently-created search state object;
  detecting using said goal processor a goal processing failure
  reverting to an earlier version of said problem state when goal processing failure occurs.

14. The method of claim 13 wherein said search state objects contain a list of alternatives further comprising the steps of:
  examining said list of alternatives in said most-recently-created search state object when said goal processing failure occurs;

identifying previous search state object when said goal processing failure occurs and when said most-recently-created search state object's list of alternatives is empty; and examining each of said previous search state objects until an alternative is located.

15. The method of claim 13 wherein said reverting to an earlier version of said problem state comprises the steps of:
releasing goal stack entries associated with said goal, said subgoals, and said alternative subgoals in said most-recently-created search state object; and
removing from said problem state said problem state modifications associated with said goal, said subgoals, and said alternative subgoals in said most-recently-created search state object.

* * * * *